Nov. 3, 1925.
P. J. MEAHL
MECHANICAL MOVEMENT
Filed June 29, 1923
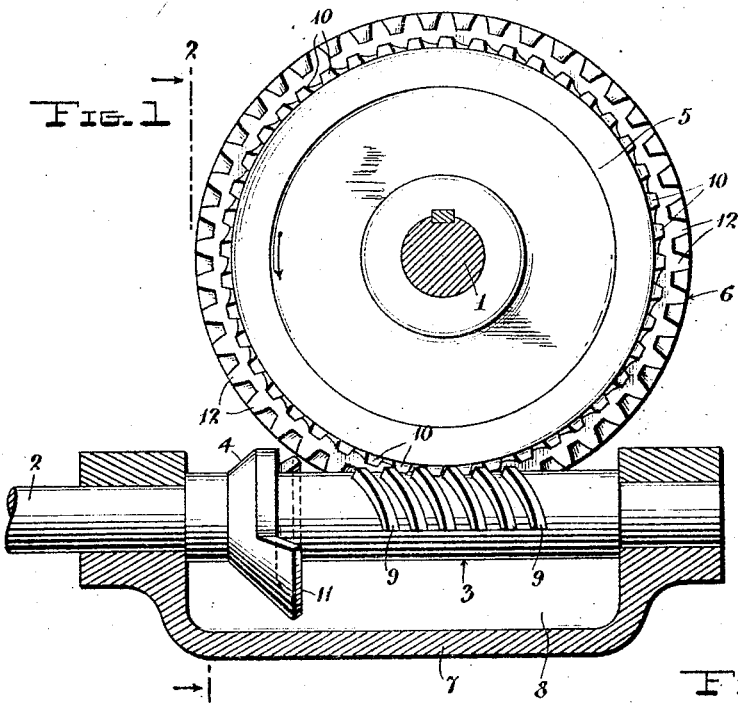
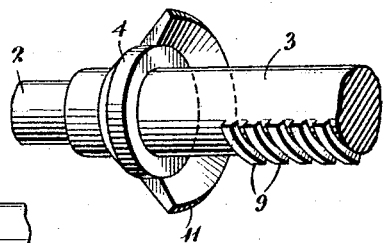
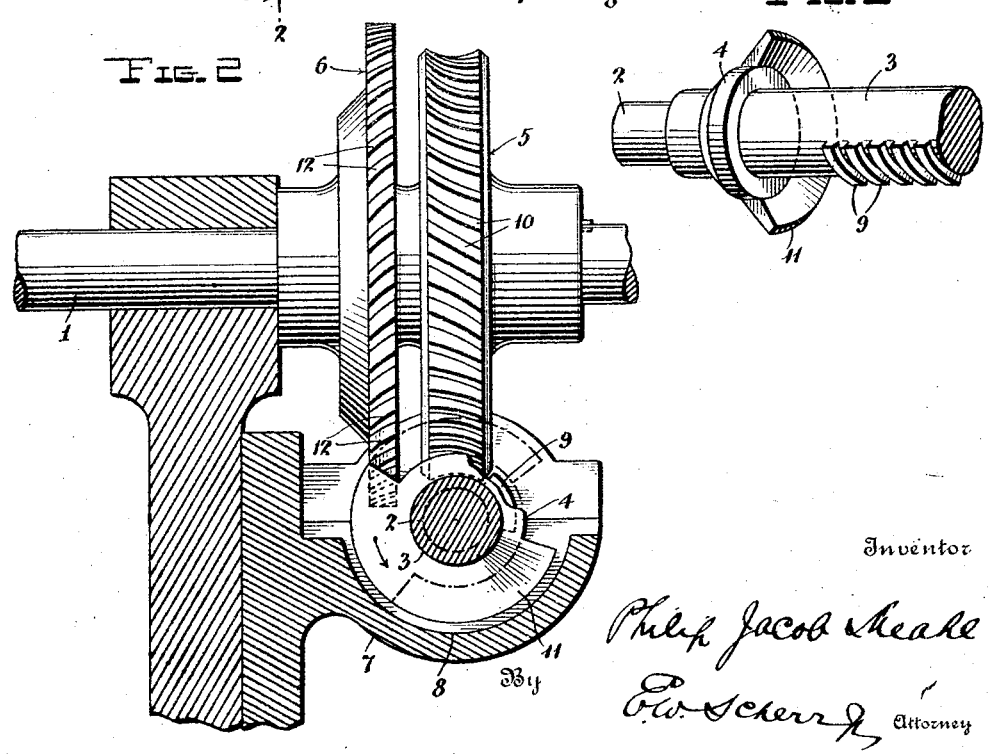
Inventor
Philip Jacob Meahl
By E. W. Scherr Jr., Attorney
1,559,970

Patented Nov. 3, 1925.

1,559,970

UNITED STATES PATENT OFFICE.

PHILIP JACOB MEAHL, OF SUMMIT, NEW JERSEY.

MECHANICAL MOVEMENT.

Application filed June 29, 1923. Serial No. 648,533.

*To all whom it may concern:*

Be it known that I, PHILIP J. MEAHL, a citizen of the United States, and resident of Summit, in the county of Union and State of New Jersey, have invented certain new and useful Improvements in Mechanical Movements, of which the following is a specification.

The present invention relates to improvements in mechanical movements, and more particularly to those of the kinds used for causing intermittent movement of a shaft or other element.

One of the primary objects of the invention is to provide a novel and improved mechanical movement of this kind which is capable of operating noiselessly and at high speeds to cause intermittent advance of a shaft or other element and to effectively lock such shaft or element from movement during the intervening idle periods. Another object is to provide a mechanical movement of this kind which is accurate with respect to the amount of movement caused at each actuation thereof, irrespective of the speed at which it is operated. Further objects are to provide a device of this kind which can be readily and inexpensively constructed so that the amount of each advance of a driven shaft or other element caused by each revolution or other given angle of rotation of a driving or controlling member may be varied as desired, and which shall be durable, it avoiding shock or vibration and being substantially free from friction.

To these and other ends, the invention consists in certain improvements and combinations and arrangements of parts, as will be hereinafter more fully described, the features of novelty being pointed out particularly in the claims at the end of the specification.

In the accompanying drawing:—

Figure 1 is an elevation, partly in section, of a mechanical movement constructed in accordance with one embodiment of the invention;

Figure 2 represents a section taken on the line 2—2 of Figure 1, parts of the structure being shown in elevation; and Figure 3 is a detail perspective view of the actuating worm and locking element of the device as shown in Figures 1 and 2.

Similar parts are designated by the same reference characters in the different views.

Mechanical movements embodying the present invention are suitable for use in various situations where it is desirable or necessary to produce or cause intermittent movements of a shaft or other element, although the invention is particularly applicable to uses where the intermittent movements of the shaft or other element occur at relatively high frequencies and also in situations where noiseless operation is desired. The preferred embodiment of the invention is shown in the accompanying drawing and will be hereinafter described in detail. It is to be understood, however, that the invention is not restricted to the precise construction shown, as equivalent constructions are contemplated and these will be included within the scope of the claims.

In the present instance, the invention is shown applied to a mechanical movement for producing or causing intermittent movements of a shaft 1, this shaft being utilized to operate or control any part of a device or machine requiring such movement; and the intermittent movement of the shaft 1 is produced or controlled by a shaft 2 which may be driven in any suitable manner, usually continuously. The mechanical movement comprises a worm and a locking member 4, both of which are keyed to or otherwise fixed on the shaft 2, and a worm wheel 5 and a locking gear or member 6, both of which are keyed to or otherwise fixed to turn with the shaft 1. A bracket or bearing box 7 may be used to support the shaft 2 and this bracket or box is preferably formed with a well or depression 8 to contain a bath of lubricant into which the worm 3 and locking member 4 may dip to afford lubrication.

The threads 9 of the worm, whether single, double, triple or quadruple, are made to suit the amount of pitch or advance to be given the worm wheel and the amount of idle movement of the worm during each revolution of the latter. If, for example, it is desired to give the worm a pitch of $\frac{3}{16}$ of an inch during $\frac{1}{4}$ of its revolution, a thread of $\frac{3}{4}$ of an inch lead may be cut. This thread is then milled off to remove all of the thread, except that which extends through $\frac{1}{4}$ of its circumference. With the worm so constructed, the thread sections thereon will give a lead of $\frac{3}{16}$ of an inch for each revolution of the worm shaft, the lead of the thread sections remaining on the worm being thus $\frac{1}{4}$ of the lead of the complete thread.

The teeth 10 of the worm wheel 5 are cut to suit the thread or threads on the worm, the worm wheel being preferably made so that its medial plane intersects the axis of revolution of the worm, as shown.

The locking gear or member 6, which is keyed on the shaft 2, or otherwise firmly fixed in its relation to the worm wheel 5, is offset to one side of the worm wheel 5, and the locking member 4 which is integral with or otherwise fixed to revolve in unison with the worm, is located beyond one end of the worm to cooperate with the locking gear 6, the latter being preferably of larger diameter than the worm wheel 5 to permit cooperation therewith of the locking member 4 without interference by the worm wheel 5. The locking member 4 in the present instance is constructed to unlock the worm wheel 5 during that part of the revolution of the worm in which the teeth thereon are engaging and acting to advance the worm wheel and to lock the worm wheel during the remainder of such revolution of the worm. Preferably and as shown in the present instance, the locking member 4 comprises a flange 11 which is made integral with the worm, the peripheral portion of the flange being arranged radially of the axis of the shaft 1 which is the center of the locking gear 6, and this portion of the flange is also concentric with and lies in a plane perpendicular to the axis of the cam shaft 2. A section of the periphery of the flange 11 is cut away or interrupted for such a distance and in such location relatively to the worm thread sections, as will cause the flange 11 to pass out of mesh with the locking member 6 when the worm threads begin to engage or mesh with the worm wheel 5, thus unlocking the worm wheel 5 to permit it to advance under the action of the worm threads, and the flange 11 begins to reengage with the locking gear 6 just as the worm threads pass out of engagement with the worm wheel. Thus at each revolution of the worm shaft, the worm threads advance the worm wheel the amount of lead desired, for example, one tooth, during which advance the worm wheel is unlocked, and the locking ring engages the locking gear during the remainder of the revolution of the worm shaft, and hence during the entire time the worm threads are idle or out of engagement with the worm wheel. The teeth 12 of the locking gear 6 with which the tooth-shaped flange 11 engage are cut on curves which are circumscribed about the axis of revolution of the locking flange so that the tooth-shaped locking flange may be made to fit closely in the tooth spaces of the locking gear, thus avoiding overthrow or excess motion of the worm wheel at each actuation thereof by the worm, and also avoiding back lash or lost motion, so that the device will operate to accurately advance the worm wheel irrespective of the speed of operation and also the device will operate at high speeds without noise.

It will be understood that any amount of advance or lead for the worm wheel may be obtained by suitably constructing the worm threads and the worm wheel teeth, as for example, by using different pitches or numbers of threads on the worm or by interrupting or cutting away different portions of the worm threads. Also, by employing gears of suitable ratio or other appropriate means between the worm and its driving shaft, the advance of the worm wheel may be made to take place once during two or more revolutions of the worm driving shaft.

By constructing and arranging the flange of the locking member so that it cooperates with the periphery of the locking gear and projects radially inwardly toward the axis thereof, and forming the teeth of the locking gear on curves which are circumscribed about the axis of revolution of the locking flange, effective meshing of the locking flange with the locking gear is attained without excessive side thrust on the locking gear and without undue wear, and moreover, such construction permits a close fit to be made and maintained between the locking flange and locking gear so that the worm and worm wheel may be closely fitted to one another, hence back lash is avoided and, in consequence, the device will operate accurately and without noise, especially when driven at high speeds.

I claim as my invention:—

1. A mechanical movement comprising, in combination, cooperative elements one of which is revoluble continuously and operative to intermittently rotate the other, a locking member co-axial, and fixed to turn with the intermittently rotatable element and having teeth projecting radially from its periphery, and a second locking member which is fixed to turn with the continuously revoluble element and having a circumferentially interrupted portion which projects radially toward and is arranged to cooperate with the radial teeth of the locking member first mentioned to lock the intermittently rotatable element during the periods between its rotating movements.

2. A mechanical movement comprising, in combination, a worm having an interrupted thread, a cooperative worm wheel, a radially-toothed locking member located at one side of and rotatable in unison with the worm wheel, and an interrupted locking member cooperative with the radial teeth of the toothed locking member and rotatable in unison with the worm.

3. A mechanical movement comprising, in combination, a worm having a sectional thread, a cooperative worm wheel, a locking gear co-axial, and fixed to rotate with the worm wheel and having radial teeth formed in its periphery, and a locking member fixed to turn with the worm and having a circumferentially interrupted portion formed to cooperate with the radial peripheral teeth of the locking gear while the worm thread is disengaged from the worm wheel.

4. A mechanical movement comprising, in combination, a worm having a circumferentially-interrupted thread, a worm wheel with which the worm cooperates intermittently, a locking gear at one side of and fixed to rotate with the worm wheel, and a locking member fixed to rotate with the worm and having a circumferentially-interrupted locking portion, the locking gear having teeth which are curved on lines circumscribed about the axis of rotation of the locking member as a center and adapted to be engaged by the locking portion of the locking member while the worm is out of cooperation with the worm wheel.

5. A mechanical movement comprising, in combination, a worm wheel, a worm to intermittently engage and advance the worm wheel, a locking gear fixed to turn with the worm wheel, and a locking member fixed to turn with the worm and having a locking flange which is presented radially to the axis of the locking gear and has locking engagement therewith during the idle periods.

6. A mechanical movement comprising, in combination, cooperative elements one of which is revoluble continuously and operative to intermittently rotate the other, a peripherally-toothed locking gear fixed to rotate with the intermittently rotatable element, and a locking member fixed to rotate with the continuously rotatable element and having a circumferentially-interrupted locking portion to cooperate with the peripheral teeth of the locking gear during the idle periods, said locking portion being presented radially to the locking gear and the teeth of the latter being curved on lines circumscribed about the axis of revolution of said locking member.

7. A mechanical movement comprising, in combination, a worm wheel, a worm having an interrupted thread to intermittently engage and advance the worm wheel, a locking gear at one side of and fixed to turn with the worm wheel, and a locking member at one side of and fixed to turn with the worm, the locking gear having teeth on its periphery which are curved on lines circumscribed about the axis of revolution of said locking member as a center, and the locking member having a circumferentially-interrupted flange which is presented radially to the locking gear and is operative to engage the peripheral teeth thereof during the idle periods.

Signed at Summit, in the county of Union and State of New Jersey, this 14th day of June, A. D. 1923.

PHILIP JACOB MEAHL.